US008835560B2

(12) United States Patent
Knoll et al.

(10) Patent No.: US 8,835,560 B2
(45) Date of Patent: Sep. 16, 2014

(54) ELASTOMERIC BLOCK COPOLYMERS HAVING STAR-SHAPED MOLECULAR ARCHITECTURE, WHERE THE STAR-SHAPED MOLECULAR ARCHITECTURE HAS AT LEAST TWO DIFFERENT ARMS IN THE STAR

(75) Inventors: Konrad Knoll, Mannheim (DE); Daniel Wagner, Bad Dürkheim (DE); Andrea Colombo, Heidelberg (DE); Geert Verlinden, Stekene (BE)

(73) Assignee: Styrolution GmbH (DE)

( * ) Notice: Subject to any disclaimer, the term of this patent is extended or adjusted under 35 U.S.C. 154(b) by 0 days.

(21) Appl. No.: 13/283,275

(22) Filed: Oct. 27, 2011

(65) Prior Publication Data

US 2012/0107540 A1 May 3, 2012

Related U.S. Application Data

(60) Provisional application No. 61/407,065, filed on Oct. 27, 2010.

(51) Int. Cl.
C08F 297/04 (2006.01)
C08F 8/00 (2006.01)
B32B 7/12 (2006.01)

(52) U.S. Cl.
CPC ............... B32B 7/12 (2013.01); C08F 297/044 (2013.01)
USPC .............................................. 525/89; 525/98

(58) Field of Classification Search
USPC ...................................................... 525/89, 98
See application file for complete search history.

(56) References Cited

U.S. PATENT DOCUMENTS

| 3,507,934 A | 4/1970 | Minor et al. |
| 3,639,517 A | 2/1972 | Kitchen et al. |
| 4,086,298 A | 4/1978 | Fahrbach et al. |
| 4,122,134 A | 10/1978 | Miki et al. |
| 4,167,545 A | 9/1979 | Fahrbach et al. |
| 6,031,053 A | 2/2000 | Knoll et al. |
| 6,197,889 B1 | 3/2001 | Knoll et al. |
| 6,235,839 B1 * | 5/2001 | Guntherberg et al. .......... 525/71 |
| 6,593,430 B1 * | 7/2003 | Knoll et al. .................... 525/314 |

FOREIGN PATENT DOCUMENTS

| DE | 2550226 A1 | 5/1977 |
| DE | 19615533 A1 | 10/1997 |
| EP | 0316671 A2 | 5/1989 |
| EP | 0436225 A1 | 7/1991 |
| EP | 0654488 A1 | 5/1995 |
| WO | WO-95/35335 A1 | 12/1995 |
| WO | WO-98/12240 A1 | 3/1998 |
| WO | WO-2010072596 A1 | 7/2010 |

OTHER PUBLICATIONS

Translation of the International Preliminary Report for PCT/EP2011/068768 dated Apr. 27, 2013.
International Search Report for PCT/EP2011/068768, mailed Dec. 21, 2011.

* cited by examiner

*Primary Examiner* — Jeffrey Mullis
(74) *Attorney, Agent, or Firm* — Drinker Biddle & Reath LLP

(57) ABSTRACT

Elastomeric block copolymers having star-shaped molecular architecture, where the star-shaped molecular architecture has at least two different arms of the star, a process for producing the elastomeric block copolymers, the use of the elastomeric block copolymers for producing moldings, or as adhesive layer in multilayer foils; as seal; as adhesion promoter or thermoplastic component in wood-plastics composites; as hot-melt adhesive component; for impact-modifying thermoplastics or elastomers, or for compatibilization, and to foils, foams, thermomoldings, injection moldings, flexible tubing, or profile extrudates composed of at least one elastomeric block copolymer.

17 Claims, No Drawings

ELASTOMERIC BLOCK COPOLYMERS HAVING STAR-SHAPED MOLECULAR ARCHITECTURE, WHERE THE STAR-SHAPED MOLECULAR ARCHITECTURE HAS AT LEAST TWO DIFFERENT ARMS IN THE STAR

CROSS-REFERENCE TO RELATED APPLICATIONS

This application claims the benefit of U.S. Provisional Application 61/407,065, filed Oct. 27, 2010, which is incorporated by reference.

BACKGROUND OF THE INVENTION

The present invention relates to elastomeric block copolymers star-shaped molecular architecture, where the star-shaped molecular architecture has at least two different arms of the star, where at least one arm of the star is composed of at least one block A which forms a hard phase and which comprises copolymerized units of at least one vinylaromatic monomer, and optionally of at least one block B which forms a first elastomeric (soft) phase and which comprises a, or a plurality of various, diene monomer(s), and of at least one elastomeric block B/A which forms a soft phase and which comprises copolymerized units not only of at least one vinylaromatic monomer but also of at least one diene, to a process for producing the elastomeric block copolymers of the invention, to the use of the elastomeric block copolymers of the invention for producing moldings, such as foils, foams, thermoformed moldings, injection moldings; or of flexible tubing or extruded profiles; or as adhesive layer in multilayer foils; as seal; as adhesion promoter or thermoplastic component in wood-plastics composites; as hot-melt adhesive component; for impact-modifying thermoplastics or elastomers, or for compatibilization in polymer mixtures, and also to foils, foams, thermomoldings, injection moldings, flexible tubings, or profile extrudates composed of at least one elastomeric block copolymer of the invention.

Block copolymers of vinylaromatics (e.g. styrene) and dienes (e.g. 1,3-butadiene) are copolymers made of a plurality of polymer molecule regions (known as blocks) which have relatively uniform internal structure and which have been arranged in series or have been linked in some other way. As a function of structure and content of diene monomers, at a certain temperature the overall properties of these materials can be elastomeric or rigid and non-elastomeric; the overall behavior of these materials in relation to their environment is therefore either elastomeric and similar to that of a polydiene, an example of an important material being that known as SB rubber, or is similar to that of transparent, impact-resistant styrene polymers. Conventional terminology is analogous to that used for impact-modified polystyrene, and those portions of the molecule which determine the elastomeric behavior are therefore termed soft phase, and the rigid portions of the molecule (generally the straight polystyrene fraction) are generally termed hard phase. SB rubbers cannot be processed as thermoplastics but instead, like conventional diene polymers, have to be vulcanized for use; this severely restricts their use and increases processing cost.

The present invention relates in general terms to transparent elastomeric block copolymers which can be processed by purely thermoplastic methods and which comprise vinylaromatics and dienes, and which have elastomeric behavior and excellent mechanical properties, and which can be produced with good space-time yields.

The following preliminary comments should be noted:

In the anionic polymerization reaction that leads to what are known as living polymers, the growth of a chain molecule takes place at a chain end which theoretically, in the absence of spontaneous chain-termination reaction or chain-transfer reaction, remains living (capable of polymerization) for an indefinite time, and the reaction of the living polymer with mono- or polyfunctional reactants provides a versatile method for constructing block copolymers, although the selection of monomers is subject to restriction. Materials that have achieved industrial significance are in essence block copolymers involving firstly vinylaromatic compounds, i.e. styrene and its derivatives, and secondly dienes, in particular butadiene or isoprene. Block copolymers are obtained by almost complete polymerization of each charge of monomer, and then changing the monomer(s). This procedure can be repeated many times.

Linear block copolymers are described by way of example in U.S. Pat. Nos. 3,507,934 and 4,122,134. Star-shaped block copolymers are described by way of example in U.S. Pat. Nos. 4,086,298, 4,167,545 and 3,639,517.

The property profile of these block copolymers is in essence a function of the content of copolymerized diene monomers, i.e. length, arrangement, and quantitative proportion of polydiene blocks and of polystyrene blocks. An important part is also played by the nature of the transition between different blocks. WO 95/35335 A1 provides a detailed description by way of example of the effect of sharp and what are known as tapered transitions (as a function of whether the change of monomer takes place abruptly or gradually).

In the case of block copolymers with tapered block transition, the distribution of sequence lengths is certainly not random, but instead there is a shift in the sequence length of the straight diene phase in relation to the polystyrene phase, and therefore of the mass ratio, in favor of the diene phase. A disadvantage of this is that the adverse properties of the diene polymers are unnecessarily emphasized in the behavior of the material during processing, while the styrene-rich end of the block impairs elastomeric properties.

The property profile (toughness, transparency, gas permeability) of materials having more than 35% by weight diene content would make them particularly suitable for medical-technology applications, such as infusion tubing and infusion drip chambers, and extensible foils, but they are very difficult to process by profile extrusion, injection molding, or blown-film extrusion. Despite stabilization with antioxidants and free-radical scavengers, they are highly heat-sensitive and tend to stick, and complicated procedures using additives are therefore necessary. Processing via extrusion or injection molding can be rendered completely impossible by what is known as blocking (adhesion of foils and flexible tubing on the roll), poor demoldability, and the tendency toward thermal crosslinking at the conventional processing temperatures.

In this connection, WO 95/35335 A1 proposes inserting, in a vinylaromatic-diene block copolymer made of blocks which form a hard phase (block type A) and of blocks which form a soft phase, in place of a straight polydiene block as soft phase, a B/A block made of diene units and of vinylaromatic units and having relatively random structure. The structure here can be, on statistical average, homogeneous or inhomogeneous along the chain. This method gives elastomeric block copolymers which can easily be produced on a large industrial scale and which have a maximum of toughness at low diene content and moreover can easily be processed like thermoplastics in extruders and injection-molding machines. These elastomeric block copolymers themselves represent a considerable advance over the styrene-rich block copolymers known hitherto having tapered block transitions, and over the diene-rich block copolymers having one or more straight diene blocks, where the diene used usually comprises 1,3-butadiene or isoprene.

DE 196 15 533 A1 says that, in order to mitigate gelling which can nevertheless occur under prolonged thermal stress and shear stress when the elastomeric block copolymers of WO 95/35335 A1 are extruded, the block (B/A) made of diene units and of vinylaromatic units has a strictly random structure where the relative proportion of 1,2-linkages of the polydiene, based on the total of 1,2- and 1,4-cis/trans linkages is always below about 12-15%. This can be achieved by producing the copolymers of vinylaromatics and of dienes via polymerization in the presence of a potassium salt soluble in nonpolar solvents.

The elastomeric block copolymers described in WO 95/35335 A1 and DE 196 15 533 A1 can still be further improved in respect of their resistance to shear.

DETAILED DESCRIPTION OF THE INVENTION

It is therefore an object of the present invention to produce elastomeric block copolymers which have the excellent properties of the elastomeric block copolymers described in. WO 95/35335 A1 and DE 196 15 533 A1, in particular with respect to hysteresis behavior and ultimate tensile strength, with a further improvement in resistance to shear, where these can be produced with substantially improved space-time yield and therefore with substantially improved total polymerization time, and can be worked up quickly, with low gel content.

This object is achieved via an elastomeric block copolymer having star-shaped molecular architecture, where the star-shaped molecular architecture has at least two different arms of the star, where at least one arm of the star is composed of at least one block A which forms a hard phase and which comprises copolymerized units of at least one vinylaromatic monomer, and optionally of at least one block B which forms a first elastomeric (soft) phase and which comprises a, or a plurality of various, diene monomer(s), and of at least one elastomeric block B/A which forms a soft phase and which comprises copolymerized units not only of at least one vinylaromatic monomer but also of at least one diene, where the glass transition temperature $T_g$ of the block B/A is below 0° C., and the proportion of the hard phase, based on the entire block copolymer, is from 1 to 40% by weight, and the total proportion by weight of the units based on the at least one vinylaromatic monomer is at least 40% by weight.

For the purposes of the present application, the expression "star-shaped molecular architecture" means that the elastomeric block copolymer of the invention has at least two arms of the star, preferably from 2 to 10, particularly preferably from 3 to 6, very particularly preferably 3 or 4, where these have been linked to one another, preferably via a coupling agent, in such a way that at least 70 mol % of the arms of the star, preferably all of the arms of the star (100% of the arms of the star) have an external vinylaromatic block.

A feature of the elastomeric block copolymers of the invention is that they can be produced with excellent space-time yields and easily on a large industrial scale. With low diene content, they have a maximum of toughness and ultimate tensile strength, and also a minimum of hardness, and can easily be processed like thermoplastics in extruders and injection-molding machines without problematic formation of gel particles (specks). Their property profile is similar to that of flexible PVC, but they can be produced with absolutely no use of low-molar-mass plasticizers that can migrate. They are resistant to crosslinking under the usual conditions of processing (from 180° C. to 220° C.). A particular feature of the elastomeric block copolymers of the invention is excellent hysteresis behavior, i.e. very good resilience and a minimum of residual deformation, with excellent resistance to shear.

Example 11 of WO 95/35335 A1 describes elastomeric block copolymers which are obtained via reaction with ethyl formate as coupling agent, and example 12 describes star-shaped elastomeric block copolymers which are obtained via coupling with epoxidized linseed oil, and example 8 of DE 196 15 533 A1 describes elastomeric block copolymers which are obtained via coupling with ethyl formate, and example 9 describes elastomeric block copolymers which are obtained via coupling with epoxidized linseed oil, but the arms of the stars in these elastomeric block copolymers are all identical. It is moreover apparent that the ultimate tensile strengths of the coupled elastomeric block copolymers having identical arms of the star are poorer than the ultimate tensile strengths of the uncoupled elastomeric block copolymers mentioned in WO 95/35335 A1 and DE 196 15 533 A1.

The elastomeric block copolymer of the present invention generally has from 2 to 10 arms of the star, preferably from 3 to 6, particularly preferably 3 or 4.

The invention also provides mixtures of stars having a different number of arms of the star, and also provides mixtures of dimers with star polymers, with uncoupled block polymers and stars, and with uncoupled block polymers, dimers, and star polymers. These mixtures are obtained by way of example when epoxidized vegetable oils are used as coupling agents.

The present invention therefore further provides a mixture of at least one elastomeric block copolymer of the invention having star-shaped molecular architecture (i) with at least one further elastomeric block copolymer of the invention having star-shaped molecular architecture, dimers of the invention, i.e, block copolymers of the invention with two arms of the star, and/or (ii) with at least one block copolymer which is composed of at least one block A which forms a hard phase and which comprises copolymerized units of at least one vinylaromatic monomer, and optionally of at least one block B which forms a first elastomeric (soft) phase and which comprises a, or a plurality of various, diene monomer(s), and of at least one elastomeric block B/A which forms a soft phase and which comprises copolymerized units not only of at least one vinylaromatic monomer but also of at least one diene, where the glass transition temperature $T_g$ of the block B/A is below 0° C., and the proportion of the hard phase, based on the entire block copolymer, is from 1 to 40% by weight, and the total proportion by weight of the units based on the at least one vinylaromatic monomer is at least 40% by weight, i.e. with at least one uncoupled block copolymer.

The elastomeric block copolymer of the invention is generally produced via anionic polymerization by means of at least one initiator and with addition of a coupling agent. An essential characteristic of the production process is adding a portion of the at least one initiator at the start of the polymerization reaction and adding the remaining portion of the initiator at one or more subsequent junctures. Double or multiple initiation therefore takes place in the invention. Further process features essential for obtaining the elastomeric block copolymers of the invention having star-shaped molecular architecture are listed below.

The abovementioned mixtures can be obtained as mentioned above by way of example via use of epoxidized vegetable oils as coupling agents.

Hard Phase (Block A)

The at least one block A which forms the hard phase is composed of at least one vinylaromatic monomer. Suitable vinylaromatic monomers are those selected from styrene and derivatives thereof substituted, in α-position or on the aromatic ring, with alkyl moieties having from 1 to 4 carbon atoms, and mixtures of said derivatives, inclusive of a combination with 1,1-diphenylethylene. Preferred vinylacomatic monomers are styrene, α-methylstyrene, p-methylstyrene, ethylstyrene, tert-butylstyrene, vinyltoluene, 1,1-diphenylethylene, and mixtures thereof. Styrene is particularly preferably used as vinylaromatic monomer.

Each arm of the star of the elastomeric block copolymer can comprise one or more block(s) A which forms the hard phase. It is possible here—if a plurality of blocks A are present—that these blocks have different molar masses. These different blocks A can respectively be present in one arm of the star. It is moreover possible that the blocks in the various arms of the star have different structure. In principle, it is also possible that only one of the arms of the star of the elastomeric block copolymer comprises a block A which forms a hard phase. However, in one preferred embodiment, each of the arms of the star of the elastomeric block copolymer comprises at least one block A which forms a hard phase. It is very particularly preferable that, in at least one arm of the star, two blocks A with different molar mass are present, where the location of the two blocks A is preferably at the two ends of the arm of the star, i.e. the first block A has been bonded to the initiator moiety and the second block A has been bonded to the coupling agent.

The molar mass ($M_w$) of the blocks A is general from 1000 to 200 000, preferably from 3000 to 80 000, particularly preferably from 6000 to 40 000 [g/mol], determined by GPC with polystyrene calibration. As mentioned above, it is possible that blocks A with different molar masses are present within an elastomeric block copolymer molecule.

The molar mass stated in the present application for the individual blocks, and also the total molar mass of the elastomeric block copolymer, is the weight-average molar mass ($M_w$) determined by GPC with polystyrene calibration.

Because the polymers produced via living polymerization have narrow molar mass distribution, the weight-average molar mass $M_w$ is practically the same as the number-average molar mass $M_n$.

The glass transition temperature $T_g$ of the block A which forms the hard phase is generally >25° C., preferably >50° C., particularly preferably >70° C.

The total amount of the hard phase in the elastomeric block copolymer of the invention is generally from 1 to 40% by weight, based on the total mass of the elastomeric block copolymer, preferably from 10 to 40% by weight, particularly preferably from 20 to 37% by weight. The total mass of the elastomeric block copolymer is calculated from the sum of the proportions by mass of the hard phase and the sum of the proportions by mass of the soft phase, where the total mass is 100% by weight.

Solid-phase NMR spectroscopy can be used to measure the proportion by mass of the hard phase and also of the soft phase. The proportion of the vinylaromatic blocks can be determined after osmium degradation of the polydiene fraction via precipitation and weighing. The future phase ratio of a polymer can also be determined from the amounts of monomers used, if the materials are always permitted to undergo complete polymerization.

A First Block B Which Forms an Elastomeric (Soft) Phase

Optionally present in the elastomeric block copolymer of the present invention, in at least one of the arms of the star, there is at least one block B which forms an elastomeric (soft) phase and which is formed from one, or from a plurality of various, diene monomer(s).

Suitable diene monomers are dienes having conjugated double bonds, preferably selected from 1,3-butadiene, isoprene, 2,3-dimethylbutadiene, 1,3-pentadiene, 1,3-hexadiene, phenylbutadiene, piperylene, and mixtures thereof. Particular preference is given to 1,3-butadiene and isoprene, and mixtures thereof. When the term "butadiene" is used below, it always means 1,3-butadiene.

This first block B which forms a first elastomeric (soft) phase generally represents one specific embodiment of a block B/A which forms a soft phase, and which usually comprises copolymerized units not only of at least one vinylaromatic monomer but also of at least one diene. If no vinylaromatic monomers are present, a block B composed exclusively of diene monomers is obtained.

The molar mass ($M_w$) of this type of block B is generally from 10 000 to 300 000, preferably from 20 000 to 150 000 [g/mol], measured by GPC with polystyrene calibration. The blocks B can have different molar masses within an elastomeric block copolymer, and also within one arm of the star. In one embodiment of the present application, in the elastomeric block copolymer at least one arm of the star comprises at least two blocks B, where these can have identical or different molar masses.

The glass transition temperature of the block B which forms the soft phase is generally $T_g$<0° C., preferably <−10° C. and particularly preferably <−20° C.

Block B/A Which Forms a Soft Phase

At least one of the arms of the star of the elastomeric block copolymer comprises at least one block B/A which forms a soft phase, where this block is composed of polymerized units not only of at least one vinylaromatic monomer but also of at least one diene (where statements above refer to a block B where no vinylaromatic monomers are present).

Suitable vinylaromatic monomers, and also suitable dienes, are those mentioned above in relation to the blocks A and B. One particularly preferred combination (B/A) of the diene monomers and vinylaromatic monomers is 1,3-butadiene and/or isoprene as diene monomers as styrene as vinylaromatic monomer. One particularly preferred combination is 1,3-butadiene/styrene.

The B/A block in the elastomeric block copolymer of the invention is usually composed of from 1 to 65% by weight of vinylaromatic monomers and from 35 to 99% by weight of diene monomers. It is particularly preferable that the B/A block has a proportion of from 10 to 60% by weight of vinylaromatic monomers and a proportion of from 90 to 40% by weight of diene, and it is very particularly preferable that it has a proportion of from 30 to 50% by weight of vinylaromatic monomers and a proportion of from 70 to 50% by weight of diene.

The glass transition temperature $T_g$ of the block B/A is below 0° C., preferably below −10° C., particularly preferably below −20° C.

The molar mass ($M_w$) of the block B/A is usually from 2000 to 250 000 [g/mol], preferably from 5000 to 150 000 [g/mol], measured by means of GPC with polystyrene calibration. Various blocks B/A in the elastomeric block copolymer or within one arm of the star can have different molar masses.

The proportion by mass of the soft phase in the solid state is of decisive importance for the mechanical properties of the elastomeric block copolymers. The proportion by mass of the soft phase made of diene- and vinylaromatic sequences in the invention is from 60 to 99% by weight, preferably from 60 to 90% by weight, particularly preferably from 63 to 80% by weight, very particularly preferably from 65 to 75% by weight. Correspondingly, the proportion by mass of the hard phase as mentioned above is from 1 to 40% by weight, preferably from 10 to 40% by weight, particularly preferably from 20 to 37% by weight, very particularly preferably from 25 to 35% by weight, where the total of hard and soft phase is 100% by weight. If the block copolymer comprises one or more soft phase(s) B composed exclusively of diene units, the proportion by mass of the soft phase composed of diene- and vinylaromatic sequences decreases correspondingly. The proportion by mass of the soft phase B can be from 0 to 50% by weight, based on the total mass of the elastomeric block copolymer, preferably from 0.5 to 20% by weight, particularly preferably from 1 to 10% by weight, very particularly preferably from 3 to 6% by weight.

It should be noted that there is no precise agreement between the belowmentioned quantitative proportions of vinylaromatic compound and diene, the threshold values stated above for the phase contents and the constitution implied by the glass transition temperature ranges of the invention, since in each case the values have been rounded to the nearest whole number of tens. Where this is the case, it would be coincidental.

The proportion of 1,2-linkages as a ratio to the total of 1,2- and 1,4-linkages of the diene can generally be from 8 to 90%, depending on the randomizer used. If a potassium compound is used as randomizer, the proportion of 1,2-linkages as a ratio to the total of 1,2- and 1,4-linkages of the diene is generally from 9 to 14%. If a Lewis base is used, the proportion of 1,2- and 1,4-linkages of the diene units generally reaches a value of from 20 to 50% for the 1,2-linkages and from 80 to 50% for the 1,4-linkages, based in each case on the total amount of diene units copolymerized (see DE 196 15 533 A1 for the former instance and WO 95/35335 A1 for the second instance).

The rubber block B/A which forms a soft phase can be a rubber block which in turn is formed from two or more different blocks B/A, where the blocks B/A differ in their molar masses and/or in their vinylaromatic/diene ratio. In one embodiment of the present invention, the soft phase can have been divided into the following blocks:
$(B/A)_1$-$(B/A)_2$
$(B/A)_1$-$(B/A)_2$-$(B/A)_1$
$(B/A)_1$-$(B/A)_2$-$(B/A)_3$,
where the vinylaromatic/diene ratio of these differs in the individual blocks B/A or changes continuously within the limits $(B/A)_1 < (B/A)_2$ within a block, where the glass transition temperature $T_g$ of each subblock is below 0° C., preferably below −10° C., and particularly preferably below −15° C.

In another embodiment, at least one of the blocks B/A in the elastomeric block copolymer of the present application has p repeating sections (subblocks) with changing monomer structure, formed via addition of the monomers in p portions, where p is from 2 to 10, or the monomer ratio changes in the manner of a gradient, e.g. extending as far as exclusive addition of the monomer B, and by way of example the constitution within the block B/A can change in such a way that no defined subblocks are formed, but instead a constitution gradient arises, where preferably $(B/A)_{p1} > (B/A)_{p2} < (B/A)_{p3}$, where, in one embodiment, the subsections $(B/A)_{p1}$ and/or $(B/A)_{p3}$ can have been replaced by $B_{p1}$ and $B_{p3}$.

That means that, in one preferred embodiment, the block B/A has a nonuniform constitution in order that, in at least one of the arms of the star of the elastomeric block copolymer, the diene content in the vicinity of the A block(s) is higher than the average of the entire B/A block. As mentioned above, this can be achieved by way of example in that the B/A block is subdivided into three separate blocks $(B/A)_1$-$(B/A)_2$-$(B/A)_3$, where $(B/A)_1$ and $(B/A)_3$ have higher diene content than $(B/A)_2$, as far as the point where the subblocks $(B/A)_1$ and $(B/A)_3$ have been replaced by the subblocks $B_1$ and $B_3$. The same effect can also be achieved via slow feed of the two monomers B and A during production of the rubber block B/A. The alteration of constitution is then not sudden, but gradual, as described above. In this case the term used is "controlled distribution polymer", as explained by way of example in US 2003/0181584 A1.

Elastomeric Block Copolymer

In one preferred embodiment, the elastomeric block copolymer is an elastomeric block copolymer in which the at least one block A which forms a hard phase is composed of styrene monomers and the at least one optionally present block B which forms a first elastomeric (soft) phase is composed of 1,3-butadiene monomers and/or of isoprene monomers, and the at least one block B/A which forms a soft phase is composed of styrene monomers as vinylaromatic monomers and of 1,3-butadiene monomers and/or isoprene monomers as diene monomers.

Particularly preferred elastomeric block copolymers have by way of example the following general formulae:

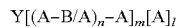

where A is a vinylaromatic block and B/A is an elastomeric block which comprises copolymerized units not only of at least one vinylaromatic monomer but also of at least one diene, and which itself in turn can have been divided into elastomeric blocks with different diene/vinylaromatic ratio or can have a gradient, Y is the moiety of an (m+l)—functional coupling agent, and m and l are mutually independently from 1 to 10, preferably 1, 2, 3, or 4, particularly preferably 1 or 2, where the sum (m+l) corresponds to the functionality of the coupling agent, and n is from 1 to 10, preferably 1, 2, or 3, particularly preferably 1. It is particularly preferable that m is 2.

Mention has been made above of suitable vinylaromatic blocks A and blocks B/A which comprise copolymerized units not only of at least one vinylaromatic monomer but also of at least one diene.

Suitable coupling agents are mentioned below. The moiety Y can readily be determined by a person skilled in the art from the coupling agents mentioned below.

In one preferred embodiment, the present invention provides an elastomeric copolymer in which m in the abovementioned formulae is 2.

The proportion by weight of the diene in the entire block copolymer is generally from 15 to 65% by weight, and that of the vinylaromatic component is correspondingly from 35 to 85% by weight. Particular preference is given to butadiene-styrene block copolymers having a monomer constitution comprising from 25 to 60% by weight of diene and from 40 to 75% by weight of at least one vinylaromatic compound.

The elastomeric block copolymers of the invention have "pentablock character", whereas WO 95/35335 A1 and DE 196 15 533 A1 relate in essence to three-block copolymers.

One arm of the star of the elastomeric block copolymer of the invention can by way of example be described as follows:

A1-(B/A)$_1$-(B/A)$_2$-(B/A)$_3$-A2-Y', where Y' is the moiety of a coupling agent which has—as a function of the functionality of the coupling agent used—at least one available coupling site. Each of A1 and A2 here represents a block which forms a hard phase and which is composed of vinylaromatic units, preferably styrene, and each of (B/A)$_1$, (B/A)$_2$, and (B/A)$_3$ represents a block which forms a soft phase and which is composed of diene- and vinylaromatic units, preferably 1,3-butadiene and styrene, where the block (B/A)$_1$ and/or (B/A)$_3$ can respectively have been replaced by a diene block B$_1$ and/or B$_3$. The possibilities for variation of the abovementioned star arm consist in the respective content of vinylaromatic monomer in the segments (B/A)$_n$ (i.e. (B/A)$_1$, (B/A)$_2$, (B/A)$_3$), and in the molar mass of these, i.e. especially the respective mass fraction of the individual segments, based on the total mass of the soft block, and also the mass fractions of A1 and A2. Care should be taken that the total diene content is within the abovementioned limits, in order to obtain an elastomeric block copolymer with the desired advantageous properties. The content of vinylaromatic monomer in the block (B/A)$_2$ should moreover not be excessively high, since otherwise the glass transition temperature of the inner region of the soft-phase domains rises and hysteresis consequently increases. The styrene content of the block (B/A)$_2$ should generally be higher than that of the blocks (B/A)$_1$ and (B/A)$_3$, as has been described above in relation to the constitution of the soft phase B/A. By way of example, a desirable styrene content in the block (B/A)$_2$ here is from 40 to 60% by weight, preferably from 45 to 55% by weight, whereas the styrene content of the blocks (B/A)$_1$ and (B/A)$_3$ is correspondingly lower, generally being from 20 to 50% by weight, preferably from 30 to 45% by weight. Extremes of this variation can—as described above in relation to the constitution of the B/A block—give straight diene blocks, where at least one arm of the star in the elastomeric block copolymer of the invention then has by way of example the following structure: A1-B$_1$-(B/A)$_2$-B$_3$-A2-Y' where the block molar mass of the butadiene blocks should be sufficiently small as to avoid occurrence of any actual butadiene domains, i.e. the molar mass of the butadiene blocks B$_1$ and B$_3$, and generally of straight butadiene blocks in any of the arms of the star of the elastomeric block copolymer, is preferably <8000 g/mol, particularly preferably <6000 g/mol. This abovementioned type of variation does not have to be applied symmetrically but can by way of example in an extreme case be restricted to (B/A)$_1$ and (B/A)$_2$, or (B/A)$_3$ and (B/A)$_2$.

In one preferred embodiment, the selection in relation to the hard phases in the abovementioned arm A1-(B/A)$_1$-(B/A)$_2$-(B/A)$_3$-A2-Y' or A1-B1-B/A-B2-A2-Y' of the star is such that the mass fraction of A1 is greater than the mass fraction of A2. It is particularly preferably twice as great.

One preferred embodiment of the present invention therefore provides an elastomeric block copolymer of the invention in which two blocks A are present, preferably with different molar masses, in at least one arm of the star, and with particular preference the external block (A1) in the at least one arm of the star has greater molar mass than the internal block (A2).

The total mass of the rubbery block copolymers of the invention is generally M$_w$ (weight-average molar mass) from 40 000 to 1 000 000 g/mol, preferably from 70 000 to 250 000 g/mol, particularly preferably from 120 000 to 200 000 g/mol (measured by GPC with polystyrene calibration, 35% of butadiene). This corresponds to a melt viscosity MVR which is generally from 200 to 0.1, preferably from 50 to 1, particularly preferably from 6 to 20 (5 kp, 200° C., 10 min$^{-1}$).

Rubbery block copolymers of this type can be processed in the preferred range without further additions, such as flow aids or oils.

Molar masses higher than those mentioned above can be useful when the intention is to add plasticizer oil in order to reduce hardness. The polarity of suitable oils is higher than that of medicinal white oil but lower than that of the familiar PVC plasticizers. Oil mixtures with white oil have proven particularly success for precise control of polarity. A suitable polar component is vegetable oils, such as sunflower oil, or else synthetic esters, and especially here aliphatic esters, such as dioctyl adipate, diisononyl adipate, and in particular diisononyl 1,2-cyclohexanedicarboxylates (e.g. Hexamoll DINCH® from BASF SE), these preferably being used in a blend with white oil. The proportion of white oil in the oil mixture is preferably from 10 to 70% by weight, particularly preferably from 20 to 50% by weight, where the entirety of white oil and of at least one polar component is 100% by weight. Very particularly suitable materials are saturated, noncrystalline aliphatic esters using a still higher aliphatic fraction in relation to the ester groups, i.e. using dicarboxylic acids of higher molar mass than adipic acid and/or using alcohols of higher molar mass than nonanol.

Production of the Rubbery Block Copolymers of the Invention

The rubbery block copolymers of the invention are produced via anionic polymerization generally in a nonpolar solvent, where the initiation process uses an initiator which is generally an organometallic compound. The production process in the invention uses addition of at least one coupling agent generally at the end of the polymerization reaction, where a portion of the at least one initiator is added at the start of the polymerization reaction and the remaining portion of the initiator is added at one or more subsequent junctures.

This process of the invention permits production of the specific elastomeric block copolymers of the invention which in particular feature star-shaped molecular architecture with at least two different branches of the star.

Suitable initiators in the anionic polymerization reaction are organometallic compounds, preferably compounds of the alkali metals, particularly preferably of lithium. Examples of initiators are methyllithium, ethyllithium, propyllithium, n-butyllithium, sec-butyllithium, and tert-butyllithium. The organometallic compound is generally added in the form of solution in a chemically inert hydrocarbon. The amount added depends in principle on the desired molar mass of the polymer, but is generally from 0.002 to 5 mol %, based on the monomers. This above amount of initiator is based on the total amount of the initiator used which—as mentioned above—is added in at least two batches, Solvents used are preferably aliphatic hydrocarbons, such as cyclohexane or methylcyclohexane.

The anionic polymerization reaction also generally uses addition of a polar cosolvent (as randomizer), and it is believed here that the cosolvent acts as Lewis base in relation to the metal cation of the initiator. Preferred Lewis bases are polar aprotic compounds such as ethers and tertiary amines. Examples of particularly effective ethers are tetrahydrofuran and aliphatic polyethers, such as ethylene glycol dimethyl ether and diethylene glycol dimethyl ether. Tertiary amines that may be mentioned are triethylamine, tributylamine, and pyridine. The amount of the polar cosolvent added to the nonpolar solvent is by way of example from 0.5 to 5% by volume. Particular preference is given to an amount of from 0.1 to 0.6% by volume of tetrahydrofuran. An amount of from 0.2 to 0.4% by volume is very particularly preferred in many instances.

The amount added of, and the structure of, the Lewis base determine the copolymerization parameters and the proportion of 1,2- and 1,4-linkages of the diene units. The resultant rubbery block copolymers generally have a proportion of from 20 to 80% of 1,2-linkages and from 80 to 20% of 1,4-linkages, based on all of the diene units. They are also suitable for subsequent hydrogenation, if the intention is to provide rubbery block copolymers that are weathering-resistant. Particularly for the hydrogenation process, preference is given to a proportion of from 30 to 60% of 1,2-linkages, and particular preference is given to from 40 to 50% of 1,2-linkages, and after the hydrogenation process these take the form of pendant ethyl groups or, expressed in different terms, butylene monomer units. The 1,4-linkages are converted by the hydrogenation process to two ethylene units in the main chain. Starting at a level of 40% of butylene units, obtainable by way of example via 0.5% by volume of THF, based on solvent, no crystallization then occurs after the hydrogenation process. If the amount of butylene units is less than 40%, hydrogenation gives a semicrystalline block polymer with relatively high hardness.

In another embodiment, a soluble potassium salt is added (as randomizer)—instead of the cosolvent—and is in particular a potassium alcoholate. It is believed here that the potassium salt interacts by metal exchange with the lithium-carbanion ion pair, thus forming potassium-carbanion compounds which preferentially form adducts with the vinylaromatic monomer, particularly preferably styrene, whereas the lithium-carbanion compounds preferentially form adducts with the diene, particularly preferably butadiene. Since potassium-carbanion compounds are substantially more reactive, even a small fraction, namely from $1/10$ to $1/50$, is sufficient, together with the predominating lithium-carbanion compounds to give a similar average probability of incorporation of vinylaromatic monomers, particularly preferably styrene, and of dienes, particularly preferably butadiene. It is preferable to select a molar lithium/potassium ratio of from 33 to 39 in order to achieve approximately identical incorporation of vinylaromatic monomer, preferably styrene, and diene, preferably butadiene. it is moreover believed that during the polymerization procedure there is frequent metal exchange between the living chains and also between a living chain and the dissolved salt, and that the same chain forms an adduct on one occasion preferentially with a vinylaromatic monomer, particularly preferably styrene, and in turn on another occasion with a diene, particularly preferably butadiene. The resultant copolymerization parameters are then approximately the same for the vinylaromatic monomer and the diene. Suitable potassium salts are particularly potassium alcoholates, in particular tertiary alcoholates having at least seven carbon atoms. Examples of typical corresponding alcohols are 3-ethyl-3-pentanol and 2,3-dimethyl-3-pentanol. Tetrahydrolinalool (3,7-dimethyl-3-octanol) and 2-methyl-2-butanol prove to be particularly suitable. Other compounds also suitable in principle alongside the potassium alcoholates are other potassium salts which are inert toward alkyl metal compounds. Mention may be made of dialkylpotassium amides, alkylated diarylpotassium amides, alkyl thiolates, and alkylated aryl thiolates. The rubbery block copolymers produced with potassium salts as randomizers generally have a proportion of from 9 to 14% of 1,2-linkages and from 91 to 86% of 1,4-linkages, based on all of the diene units.

DE 196 15 533 A1 discloses a suitable process for producing the rubbery block copolymers of the invention with use of a soluble potassium salt. WO 95/35335 discloses a suitable process for producing the elastomeric block copolymers of the invention in the presence of a polar cosolvent.

One preferred embodiment for achieving a relatively high proportion of monomer B at the transition to the A1 block, for example in the arm A1-$(B/A)_1$-$(B/A)_2$-$(B/A)_3$-A2-Y' of the star, consists in using a somewhat reduced amount of randomizer in polymerizing the $(B/A)_1$ block.

In one embodiment of the present invention, this means the use of, for example, from 0.20 to 0.26% by volume of THF, based on cyclohexane, instead of the amount of THF required for uniform polymer incorporation, which is from 0.27 to 0.33% by volume. For the polymerization of the subsequent (B/A) blocks, it is preferable to add more THF to reach a level of from 0.27 to 0.33% by volume of THF.

In another embodiment, a soluble potassium salt is used as randomizer, preferably a potassium alcoholate, and at the start of the polymerization process here for the B/A block the molar lithium/potassium ratio selected is >39, i.e. a lithium/potassium ratio which brings about predominant incorporation of the diene, preferably butadiene, in relation to the vinylaromatic monomer, preferably styrene. It is preferable to add further K for polymerizing the subsequent (B/A) blocks, initially to give a molar lithium/potassium ratio of from 33 to 39, in order to bring about approximately equal incorporation of vinylaromatic monomer, preferably styrene, and diene, preferably butadiene, and finally to give a molar lithium/potassium ratio<33, in order to bring about predominant incorporation of the vinylaromatic monomer, preferably styrene, in relation to the diene, preferably butadiene.

The polymerization temperature is generally from 0 to 130° C., preferably from 30 to 100° C., and particularly preferably from 35 to 90° C.

The polymerization reaction is generally carried out in a plurality of stages, where the initiator is added in a plurality of batches, preferably using a double initiation process. By way of example, the process begins by producing the hard block A. A portion of the monomers is used as initial charge in the reactor, and the polymerization reaction is initiated via addition of a portion of the initiator. In order to achieve a defined chain structure that can be calculated from the amount of monomer and of initiator added, it is advisable to achieve high conversion (above 99%) in the process before the second monomer addition takes place. However, this is not essential.

The sequence of monomer addition depends on the selected block structure. In the case of a batch process, it is preferable to begin by using all of, or a portion of, the solvent, such as cyclohexane, as initial charge, and then to use, as initial charge, the amount of initiator, such as sec-butyllithium, that is required to establish the desired molar mass, plus what is known as a titration amount, which serves to destroy traces of impurities in the solvent and in the tank. It is then preferable to add the potassium salt, such as potassium tert-amyl alcoholate, preferably dissolved in cyclohexane, or to add the complexing solvent, such as THF to the reactor, and then to add the first amount of styrene, in order to produce the first block A. Diene and vinylaromatic are then added, preferably simultaneously. The addition can take place in a plurality of portions optionally together with further solvent, e.g. for improved heat dissipation, and as a function of the desired constitution. The random structure, and the constitution, of the block B/A are determined via the quantitative proportion of diene with respect to vinylaromatic compound, the concentration of the potassium salt, if a potassium salt is used, and the concentration and chemical structure of the Lewis base used as cosolvent, if a Lewis base is used, and also the temperature. The proportion by weight of the diene relative to the total mass inclusive of vinylaromatic compound is from 25 to 70% in the invention.

A further block A can then be polymerized onto the material via addition of the vinylaromatic compound. It is preferable that the second initiation process, i.e. the second addition of the initiator, takes place prior to the addition of the vinylaromatic compound intended to polymerize the second block A onto the material.

In an equally preferred embodiment, in a further, separate reactor, a living polymer A is produced by means of the process as described above for the first block A, and after the polymerization of the block B/A and preferably of a further block A has been concluded in the first reactor the two living polymers are combined; this can take place in one of the two reactors or in a third reactor. In this embodiment, the living polymer A and the block A polymerized last can have unequal molar masses. In the case of double or multiple initiation in the same reactor, the molar mass of the newly initiated polymer and of the block polymerized onto the material is practically identical.

In another embodiment of the process of the invention, coupling with a coupling agent takes place after the last addition of monomer, preferably the addition of the vinylaromatic compound, and a plurality of polymer blocks are thus bonded to one another, and the rubbery block copolymer of the invention having star-shaped molecular architecture is formed.

It is generally possible to use any bi- or polyfunctional compound as coupling agent. It is preferable that the coupling agent has been selected from epoxidized vegetable oils, such as epoxidized linseed oil or epoxidized soybean oil, silanes, such as alkoxysilanes, e.g. $Si(OMe)_4$, chlorosilanes, such as $SiCl_4$, $Si(Alkyl)_2Cl_2$, $Si(alkyl)Cl_3$, where alkyl is a $C_1$-$C_4$-alkyl moiety, preferably methyl, halides of aliphatic hydrocarbons, such as dibromomethane or bischloromethylbenzene, tin tetrachloride, polyfunctional aldehydes, such as terephthaldehyde, polyfunctional ketones, polyfunctional esters, such as carboxylic esters, e.g. ethyl acetate, diethyl succinate, dimethyl or diethyl adipate, polyfunctional anhydrides, and di- and oligoepoxides, such as 1,4-butanediol glycidyl ether, activated diolefins, such as diisopropenylbenzene, divinylbenzene, or distyrylbenzene; preferred coupling agents are epoxidized vegetable oils, such as epoxidized linseed oil or epoxidized soy oil, and silanes, such as alkoxysilanes, e.g. $Si(OMe)_4$. Other suitable coupling agents are mentioned by way of example in U.S. Pat. Nos. 3,985,830, 3,280,084, 3,637,554, and 4,091,053.

The coupling agent forms the coupling center Y, which is formed by reaction of the living anionic chain ends with one of the abovementioned coupling agents.

The amount of coupling agent is calculated as a function of its functionality and of the amount of initiator used. It is preferable to add the amount of coupling agent needed for reacting all of the living chains, corresponding to the amount of active initiator (total amount of initiator minus titration amount). In the case of ester groups, account has to be taken of the fact that these form two living chains, whereas in contrast epoxides and haloalkanes and -silanes form one per functional group. By way of example, epoxidized soybean oil comprises fatty acids esterified in the form of triglyceride having predominantly one or two epoxy groups, and correspondingly predominantly forms bonds with three or four polymer chains, liberating the metal alcoholate of glycerol, since the carboxy group also forms bonds with two further chains. However, it is generally also possible to use an excess of coupling agent, and in the case of epoxidized vegetable oil preferably an excess of from 10 to 20% by weight. Excesses generally reduce the number of arms of star, since it is then not possible for all of the functional groups to react. This can be avoided if the addition of the coupling agent to the living polymer solution is sufficiently slow that it is consumed by reaction on input. The product is then stars with the maximum possible number of arms, alongside unreacted coupling agent.

It is possible to use the same initiator in each initiation step of the process of the invention for producing the elastomeric block copolymer of the invention. However, it is also possible in principle to use various initiators.

The concentration can be varied widely, but should preferably be selected in such a way that the temperatures at the end of the polymerization reaction for the individual blocks do not exceed values of 100° C. or if they exceed that value then at most for a short time, thus avoiding any significant premature thermal termination. Typical polymer concentrations after the coupling process, in the case of a batch process in a stirred tank, are from 10 to 50% by weight, preferably from 20 to 40% by weight, and particularly preferably from 25 to 35% by weight.

Instead of a stirred tank, preferably in combination with a reflux condenser, where the internal pressure of the tank is preferably lowered to cool the reaction solution via boiling and reflux of the solvent, it is in principle also possible to use other types of reactor, for example a loop reactor in combination with a cooled section, such as a heat exchanger, or to use a stirred tank in combination with an external heat exchanger. Instead of producing the elastomeric block copolymers of the invention in a batch process, they can be produced in a continuous process via, for example, arrangement in series of the reactors listed above in various combinations, or in a tubular reactor with preferably static mixing elements, or via a combination of tubular reactor and the reactors listed above. The number of reaction zones is preferably the same as the number of different monomer additions plus the coupling agent addition. At the start, and at the appropriate points, the initiator system, generally comprising initiator and randomizer and optionally further solvent, is additionally mixed; it is preferable here to add the solvent to the monomer feeds so that the monomer is in dilute form before it reaches the reactor. In one preferred embodiment, the polymer concentration is kept constant in the range from 15 to 35% by weight along the reactor cascade. In another preferred embodiment, the polymer concentration is increased to from 36 to 50% by weight through the final monomer addition.

Features of the present invention are therefore that it
a) comprises multiple initiation, preferably double initiation,
b) preferably comprises a coupling step, particularly preferably a coupling step after a second styrene polymerization reaction, and
c) in one preferred embodiment, places the second initiation process before a second styrene polymerization reaction.

The molar ratio of the first and the second initiation process also plays a part in the process of the invention in respect of the structure of the elastomeric block copolymer of the invention (initiation ratio). In the case of a star having, for example, four arms, preference is given to a ratio of 1:1, where, on average, two A1-B/A-A2 arms and two A polymers have been bonded (pseudolinear architecture), when the final monomer addition after the second initiation process is addition of a vinylaromatic monomer.

It is also preferable that A1 is greater than A2 but that A2 is sufficiently long to give phase separation, i.e. that the A2 blocks are at least to some extent present in a separate A phase and have not been homogeneously mixed into the B/A phase, as stated above.

In one particularly preferred embodiment, a particular feature of the structure of the elastomeric block copolymer consists in the following points:
- even the uncoupled A1-B/A-A2 block copolymers are not merely formally hard-soft-hard three-block systems, but also behave as such and contribute to strength;
- dimers which have no Y segment, and stars having the block sequence (A1-B/A-A2-)$_2$(A2-)Y have hard-soft-hard-soft-hard pentablock character and have higher mechanical strength than triblock systems and are therefore particularly preferred;
- stars having the block sequence (A1-B/A-A2-)$_3$(A2-)nY, where (n=1, 2, 3, . . . 7) and (A1-B/A-A2-)$_4$(A2-)nY, where (n=1, 2, 3, . . . 6) likewise have pentablock character;
- stars having the block sequence (A1-B/A-A2-)$_1$(A2-)$_n$, where (n=1, 2, 3, . . . 9), fully achieve the strength of A-B/A-A three-block systems;
- (A2-)$_n$ (n=1, 2, 3, . . . 9) fractions of stars act as lubricant, but do not impair strength or impair hysteresis behavior.

The initiation ratio—for double initiation—is generally from 10:1 to 1:10, preferably from 4:1 to 1:4, particularly preferably from 2:1 to 1:2 and very particularly preferably from 1.5:1 to 1:1.5.

The further work-up of the elastomeric block copolymer of the invention takes place by conventional processes. It is advisable here to operate in a stirred tank and, after the coupling process, optionally use a small amount of alcohol, such as isopropanol, to protonate the possible small amounts of residual carbanions and the polymer-bonded alcoholates which may have been produced in the coupling step, in order to avoid formation of deposits in the tank and discoloration of the product, and to lower the viscosity of the solution, and, prior to further work-up, to use $CO_2$/water in a conventional manner to acidify the product slightly, so that the product subsequently obtained is glass-clear with no color tinge, and to stabilize the polymer with a free-radical scavenger or preferably with a combination of free-radical scavengers (e.g. C-free-radical scavengers, such as a-tocopherol (vitamin E), Sumilizer® GM and Sumilizer® GS, in combination with O-free-radical scavengers, such as Irganox® 1010 and Irganox® 1076) and with a secondary oxidation inhibitor (e.g. commercially available products preferably based on phosphite, an example being triisononylphenyl phosphite (TNPP) or Irgafos® 168), and use the conventional processes to remove the solvent, and extrude and pelletize the product. One preferred process for removing the solvent is to decrease the concentration of the solvent in stages, where, if the polymerization reaction uses a batch process, the solution is advantageously first placed into intermediate storage in a buffer tank, and then is preferably after passage through a pump heated by way of one or more heat exchangers in series to a temperature which is preferably from 100 to 140° C. above the boiling point of the solvent (this being from 180 to 220° C. in the case of cyclohexane), in order then after passage through a pressure-retention valve to be transferred via a short pipe with vapor velocities which are preferably from 100 to 350 m/s into a depressurization vessel of which the pressure and temperature are preferably adjusted in such a way that the solvent just begins to condense and the surface has a coating of a solvent film, i.e. is not dry; for cyclohexane as solvent, it is preferable here to select temperatures of from 100 to 140° C. and pressures of from 1.6 to 4.3 bar. The solvent vapor is preferably discharged upward out of the depressurization vessel, and condensed and passed for work-up, while the polymer solution, the concentration of which is now about 70-95%, gives a precipitate in the form of flakes on the base of the vessel, from where it can be conveyed onward by way of example by a gear pump into the next heat exchanger and can be reheated, preferably to from 170 to 230° C. The solution is then again depressurized by way of a pressure-retention valve onto the screws of a preferably twin-screw extruder, where the solvent vapor is discharged by way of vent domes upstream of and downstream of the polymer feed point. The concentration of the solvent is then preferably further reduced in extruder segments with barrier screw elements which seal against one another, while the vacuum continues to improve and upstream of the extruder head is preferably from 1 to 30 mbar, and small amounts of water are preferably injected, until the solvent content achieved is preferably <3000 ppm, particularly preferably <2000 ppm. At the end of the extruder, the melt can be either strand-pelletized or underwater-pelletized, preference being given here to the underwater pelletization process. However, it is also possible to remove the solvent by way of other processes, for example by way of what is known as a Filmtruder in combination optionally with an extruder, or via steam stripping, as is conventional in the case of most styrene-based thermoplastic elastomers. In this case, polymer flakes are obtained. The pellets or the flakes can, like other types of rubber, be protected from adhesion by using an antiblocking agent, such as Acrawax®, Besquare®, Aerosil®, and/or tricalcium phosphate.

Instead of treatment of the polymer solution with additives and removal of the solvent therefrom, it can equally preferably be first subjected to a hydrogenation process, after the coupling process, and then passed for further work-up. For this purpose it is preferable to use block polymers of the invention having a proportion of from 30 to 80% of 1,2-linkages of the butadiene units, particularly from 35 to 50%, and these can be obtained as described above via addition of coordinating solvents, such as THF. Block polymers of the invention having isoprene units are likewise preferred for the subsequent hydrogenation process. The solution with the block polymers of the invention is preferably transferred into a hydrogenation reactor equipped for this purpose with a gassing stirrer or with any other high-speed stirrer which also provides vertical mixing, and a hydrogenation catalyst is added, and the mixture is hydrogenated with introduction of hydrogen gas under pressure until the amount of originally present olefinic double bonds that have reacted is preferably >90%, particularly preferably >98%, very particularly preferably >99%. Examples of suitable hydrogenation catalysts are nickel, palladium, and platinum in the form of metal, powder, or metal sponge, or in the form supported by way of example on activated charcoal, or in the form of Raney nickel, or in the form of colloid obtained by way of example from reduction of nickel salts with, for example, alkylaluminum compounds, other examples being titanium complexes, zirconium complexes, and hafnium complexes, and other hydride-forming metals and metal complexes. The hydrogen pressure can be selected to be from 0.1 to 1000 bar, preferably from 1 to 200 bar, particularly preferably from 10 to 200 bar. Suitable hydrogenation temperatures are from 20 to 300° C., preferably from 50 to 200° C., particularly preferably from 80 to 150° C. The hydrogenation process is preferably carried out adiabatically, starting from the final polymerization temperature, which is preferably from 80 to 105° C. (The coupling process does not in practice alter the temperature.) After the hydrogenation process, the catalyst is removed by way of example via a combination of oxidation and washing of the polymer solution with water, where the oxidation process can use a peroxide, such as hydrogen peroxide, preferably in combination with an acid, such as formic acid, acetic acid, or phosphoric acid. Another possible removal process consists in adsorption on a suitable carrier material, which can be inorganic, for example silica gel, or an organic ion-exchanger resin. In the case of heterogeneous catalysis, the removal process can use filtration, preferably deep-bed filtration using a layer of kieselguhr. The preferably supported noble metal catalysts can optionally be reused for the next hydrogenation batch. A hydrogenation process to which preference is further given consists in passing the polymer solution together with hydrogen over a solid catalyst bed, where the location of the fixed-bed catalyst is preferably in a vertical tube, and feeding the solution downward, and feeding the hydrogen upward in countercurrent.

Other suitable hydrogenation processes are mentioned by way of example in WO 98/12240 A1.

The present application further provides a thermoplastic elastomeric molding composition obtainable via hydrogenation of the elastomeric block copolymer of the invention.

A particular feature of the process of the invention is that the elastomeric block copolymer of the invention can be produced with good space-time yields. The space-time yield (STY) for a batch polymerization process, i.e. from the juncture at which the first monomer charge has been combined with the first initiator charge until conclusion of the coupling process, i.e. the juncture at which optional addition of alcohol and evacuation of the reactor can be started, is generally from 0.5 h to 5 h, preferably from 1 to 3 h, particularly preferably from 1 h to 2 h.

The property profile of the block copolymers of the invention is very similar to that of flexible PVC, but they can be produced entirely free from low-molar-mass plasticizers that can migrate. They are resistant to crosslinking under the conventional conditions of processing (from 180 to 250° C.). Rheography can be used to provide clear evidence of the excellent resistance of the polymers of the invention to crosslinking. The experimental arrangement is the same as that for MVR measurement. The pressure rise is recorded as a function of time at constant melt flow rate. Even after 20 minutes at 250° C., the polymers of the invention exhibit no pressure rise, and give a smooth melt extrudate.

Another feature of the block copolymers of the invention is high oxygen permeation $P_o$ and water vapor permeation $P_w$, above 2000 [cm$^3$·100 mm/m$^2$·d·bar] and, respectively, above 10 [g 100 mm/m$^2$d·bar], where $P_o$ and $P_w$ give the amount of oxygen in cm$^3$ and, respectively, the amount of water vapor in grams, per day and per bar of partial pressure difference, that passes through one m$^2$ of foil with standard thickness 100 mm. High resilience on deformation of the type observed in thermoplastic elastomers, high transparency (above 90% at 10 mm layer thickness), low welding temperature, below 100° C., and wide welding range (over 5° C.) with moderate tack make the elastomeric block copolymers of the invention a suitable starting material for producing what are known as extensible foils or stretch foils, infusion tubes, and other extruded, injection-molded, thermoformed, or blow-molded finished parts which require high transparency and toughness, in particular for applications in the field of medical technology.

The present invention further provides the use of the elastomeric block copolymers of the present invention for producing moldings, such as foils, foams, thermoformed moldings, and injection moldings; or of flexible tubing or extruded profiles; or as adhesive layer in multilayer foils; as seal; as adhesion promoter or thermoplastic component in wood-plastics composites; as hot-melt adhesive component; for impact-modifying thermoplastics or elastomers, or for compatibilization in polymer mixtures that are otherwise incompatible and which undergo macroscopic demixing.

One important application of the block copolymers of the invention is provided by various foil applications, examples being extensible foils and clingfoils, foils for shrink covers, or as adhesive layer in multilayer foils for, by way of example, controlled atmosphere packaging, or for (recloseable) seals, and also extrusion applications, such as tubing, for example for infusion systems and other medical applications, and also extruded profiles, for example in the construction sector, or in highly filled form as floorcovering.

The thermoplastic block copolymers of the invention can moreover be used as adhesion promoter or thermoplastic component in wood-plastics composites (WPCs), for example in combination with polypropylene. The block copolymers of the invention are moreover suitable as impact modifier in thermoplastics such as GPPS, HIPS, ABS, polyolefins, such as polyethylene and polypropylene, and mixtures thereof, and as blend component in thermoplastic elastomers such as TPUs (for reducing cost), SBS, SIS, SEBS, and SEPS (where the meanings of these letters or combinations of letters are as follows: B polybutadiene, I polyisoprene, EB poly(ethylene-butylene)=hydrogenated polybutadiene having increased 1,2-fraction, EP poly(ethylene-propylene)=hydrogenated polyisoprene), and also in thermoplastic vulcanizates based on EPDM/PP (compatibilizer particularly with respect to styrene polymers, especially in two-component injection molding). The elastomeric block copolymers of the invention are moreover particularly suitable as toughening component in flexible polystyrene foam.

The elastomeric block copolymers of the invention are moreover highly suitable for injection-molding applications, e.g. in the toy sector (dolls, toy figures, etc., and an important factor here is approval of the polymers under food regulations), and for hard-soft connections (and an important factor here is the good adhesion of the elastomeric block copolymers of the invention on a wide variety of polymers), and for soft-touch applications and antislip applications, especially of plastified elastomeric block copolymer.

The elastomeric block copolymer of the invention can be used in the form of powder in centrifugal casting, e.g. for dolls' heads.

Other possible uses are the use as hot-melt-adhesive component, in particular together with resins, and as filler, and also for asphalt modification.

In one preferred embodiment, the elastomeric block copolymer of the invention can be used as container, for example as tubing, for adhesive bitumen in order to simplify transport within the chain, and the bitumen can then be melted and homogenized together with the elastomeric block copolymer, which then improves the properties of the road surfacing.

The present invention also provides foils, foams, thermoformed moldings, injection moldings, flexible tubing, or extruded profiles composed of at least one elastomeric block copolymer of the present invention.

If the application involves prolonged weathering or thermal stress, preference is given to the hydrogenated form of the elastomeric block copolymer of the invention. By way of example, this applies to applications in motor vehicles, and for toys and sports equipment for the outdoor sector, in open-air swimming pools and indoor swimming pools, and in the high-quality sanitary and health sector, and for shrinkwrap applications where the product requiring protection is stored outdoors, and for outdoor applications within the construction sector, and for producing weathering-resistant hot-melt adhesives and weathering-resistant pressure-sensitive adhesives, and for improving toughness in weathering-resistant thermoplastics, for example in styrene-acrylonitrile copolymers or in (meth)acrylate-based polymers.

The invention claimed is:

1. An elastomeric block copolymer having star-shaped molecular architecture, where the star-shaped molecular architecture comprises at least two different arms, where at least one arm is composed of at least one block A which forms a hard phase and which comprises copolymerized units of at least one vinylaromatic monomer, and optionally of at least one block B which forms a first elastomeric (soft) phase and which comprises a, or a plurality of various, diene monomer(s), and of at least one elastomeric block B/A which forms a soft phase and which comprises copolymerized units not only of at least one vinylaromatic monomer but also of at least one diene, where the glass transition temperature $T_g$ of the block B/A is below 0° C., and the proportion of the hard phase, based on the entire block copolymer, is from 1 to 40% by weight, and the total proportion by weight of the units based on the at least one vinylaromatic monomer is at least 40% by weight.

2. The elastomeric block copolymer according to claim 1, which has from 2 to 10 arms of the star.

3. The elastomeric block copolymer according to claim 1, wherein the vinylaromatic monomer has been selected from styrene and derivatives thereof substituted, in α-position or on the aromatic ring, with alkyl moieties having from 1 to 4 carbon atoms, and mixtures of said derivatives, inclusive of a combination with 1,1-diphenylethylene.

4. The elastomeric block copolymer according to claim 1, wherein the diene is a diene having conjugated double bonds.

5. The elastomeric block copolymer of claim 1, wherein the at least one block A which forms a hard phase is composed of styrene monomers, the at least one optionally present block B which forms an elastomeric (soft) phase is composed of of 1,3-butadiene monomers and/or of isoprene monomers, and the at least one block B/A which forms a soft phase is composed of styrene monomers as vinylaromatic monomers of 1,3-butadiene monomers and/or isoprene monomers as diene monomers.

6. The elastomeric block copolymer according to claim 1, wherein two blocks A are present, in at least one arm.

7. The elastomeric block copolymer according to claim 1, wherein the soft phase B/A is formed from 2 or more different blocks B/A, where the blocks B/A differ in their molar mass and/or in their vinylaromatic/diene ratios.

8. The elastomeric block copolymer according to claim 1, wherein there are, within the block B/A, p repeating sections (subblocks) with changing monomer structure, formed via addition of the monomers in p portions, wherein p is from 2 to 10, or the monomer ratio B/A changes in the manner of a gradient, extending as far as exclusive addition of the monomer B.

9. The elastomeric block copolymer according to claim 8, wherein the constitution within the block B/A changes in such a way that no defined subblocks are formed, but instead a constitution gradient arises.

10. The elastomeric block copolymer according to claim 1, which has one of the following general formulae:

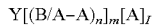

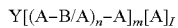

where A is a vinylaromatic block and B/A is an elastomeric block which comprises copolymerized units not only of at least one vinylaromatic monomer but also of at least one diene, and which itself can have been divided into elastomeric blocks with different diene/vinylaromatic ratio or can have a gradient, Y is the moiety of an (m+I)-functional coupling agent, and m and I are mutually independently from 1 to 10, where the sum (m+I) corresponds to the functionality of the coupling agent, and n is from 1 to 10.

11. The elastomeric block copolymer according to claim 10, wherein m is 2.

12. The elastomeric block copolymer according to claim 10, wherein n is 1.

13. A process for producing an elastomeric block copolymer according to claim 1 via anionic polymerization by means of at least one initiator and with addition of at least one coupling agent, which comprises adding a portion of the at least one initiator at the start of the polymerization reaction and adding the remaining portion of the initiator at one or more subsequent junctures.

14. The process according to claim 13, wherein the coupling agent is a bi- or polyfunctional compound.

15. A thermoplastic elastomeric molding composition obtained via hydrogenation of the elastomeric block copolymer of claim 1.

16. A mixture comprising at least one elastomeric block copolymer according to claim 1
   (i) with at least one further elastomeric block copolymer according to claim 1, and/or
   (ii) with at least one block copolymer which comprises at least one block A which forms a hard phase and which comprises copolymerized units of at least one vinylaromatic monomer, and optionally of at least one block B which forms a first elastomeric (soft) phase and which comprises a, or a plurality of various, diene monomer(s), and of at least one elastomeric block B/A which forms a soft phase and which comprises copolymerized units not only of at least one vinylaromatic monomer but also of at least one diene, where the glass transition temperature Tg of the block B/A is below 0° C., and the proportion of the hard phase, based on the entire block copolymer, is from 1 to 40% by weight, and the total proportion by weight of the units based on the at least one vinylaromatic monomer is at least 40% by weight.

17. A molding, flexible tubing, extruded profile, adhesive layer in multilayer foils, seal, adhesion promoter, thermoplastic component in wood-plastics composites, hot-melt adhesive component, impact-modifier for thermoplastics or elastomers, or compatibilizer in polymer mixtures that are otherwise incompatible comprising at least one elastomeric block copolymer according to claim 1.

* * * * *